Patented Feb. 21, 1939

2,147,947

UNITED STATES PATENT OFFICE

2,147,947

INSECTICIDE

Valdemar A. Johnson, Trenton, N. J.; dedicated to the free use of the People in the territory of the United States No Drawing. Application November 2, 1938, Serial No. 238,392

1 Claim. (Cl. 167—35)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which in its gaseous state can be used as an insecticide for destroying insect pests which may be present in commodities prepared commercially for market.

Methyl bromide is known to be an excellent insecticide and can be used in its gaseous state as a fumigant. Likewise, hydrocyanic acid has long been known to be an excellent insecticide in its gaseous state, and both fumigants have been used commercially for the destruction of insects in produce and other materials. With either fumigant a certain dosage, that is a certain concentration of the chemical compound in the air, is required in order to kill insects. Likewise, the fumigants must be applied at favorable temperatures and with a sufficient exposure period to be effective. It has been shown that a dosage of 2 pounds of methyl bromide per 1,000 cubic feet of space is necessary to insure complete mortality of Japanese beetles in produce in refrigerator cars in two hours at a temperature of 70° or above. Complete mortality of the adult Japanese beetles cannot be obtained in a tight chamber at a dosage of one pound per 1,000 cubic feet with an exposure of two hours at a temperature of 70° F.

With hydrocyanic acid it requires a dosage of more than 6 ounces of hydrocyanic acid per 1,000 cubic feet to insure complete mortality of adult Japanese beetles with an exposure of two hours at a temperature of 70°. Complete mortality of adult Japanese beetles cannot be obtained with a dosage of 2 ounces of hydrocyanic acid per 1,000 cubic feet of chamber space at a temperature of 70° F. when no produce is present in the room.

My invention consists in mixing gaseous methyl bromide with gaseous hydrocyanic acid and producing a fumigant which is more effective than either fumigant alone at comparable dosages. For example, it has been shown that one pound of methyl bromide per 1,000 cubic feet is not a sufficiently high concentration of the fumigant to produce complete mortality of the Japanese beetle in a fumigation vault at temperatures ranging from 65° to 70° F. It has also been shown that two ounces of hydrocyanic acid will not produce complete mortality of the Japanese beetle at the same temperatures and exposure per 1,000 cubic feet.

I have discovered that by mixing ½ pound of methyl bromide with 1 ounce of hydrocyanic acid complete mortality of the Japanese beetle can readily be obtained at temperatures of 66° to 70° F. That is, in combination of the two fumigants exert a synergistic action. One fumigant accelerates or enhances the toxic action of the other compound in its effect on the insect. This synergistic effect occurs at other concentrations of the two compounds, and other proportions of the compounds. It is not limited to temperatures of 66° to 70°, as it is evident at other temperatures. Neither is it limited to its effect on the Japanese beetle. My invention then covers any combination of hydrocyanic acid and methyl bromide in any proportions used as fumigants, that is, applied as a gaseous insecticide for the destruction of any insect pests or any fungus diseases under various temperatures and under all conditions.

Having thus described my invention, what I claim for Letters Patent is:

The method for destroying the growth of living organisms, which comprises subjecting said organisms to the action of a gas, comprising hydrocyanic acid and methyl bromide in the proportion of 1 ounce of hydrocyanic acid and ½ pound of methyl bromide per 1,000 cubic feet of space.

VALDEMAR A. JOHNSON.